US009166724B2

(12) United States Patent
Yamashita

(10) Patent No.: US 9,166,724 B2
(45) Date of Patent: Oct. 20, 2015

(54) OPTICAL NETWORK AND OPTICAL PATH SETUP METHOD

(75) Inventor: Shinji Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 764 days.

(21) Appl. No.: 13/471,767

(22) Filed: May 15, 2012

(65) Prior Publication Data

US 2013/0022352 A1    Jan. 24, 2013

(30) Foreign Application Priority Data

Jul. 21, 2011 (JP) ................................. 2011-159674

(51) Int. Cl.
*H04J 14/00* (2006.01)
*H04J 14/02* (2006.01)

(52) U.S. Cl.
CPC ......... *H04J 14/0212* (2013.01); *H04J 14/0257* (2013.01); *H04J 14/0267* (2013.01); *H04J 14/0283* (2013.01)

(58) Field of Classification Search
CPC . H04J 14/0212; H04J 14/021; H04J 14/0213; H04J 14/0205; H04J 14/0241; H04J 14/0201; H04J 14/0257; H04J 14/0228; H04J 14/0268; H04J 14/0227; H04J 14/0284; H04Q 2011/0018; H04Q 11/0005; H04Q 2011/0009; H04Q 2011/0016; H04Q 2011/0052; H04Q 2011/0039; H04Q 2011/0024; H04Q 2011/003; H04L 49/153
USPC ........................ 398/45, 48–51, 54–57, 69, 83, 398/135–139, 140
See application file for complete search history.

(56) References Cited

U.S. PATENT DOCUMENTS

| 4,873,681 | A  | * | 10/1989 | Arthurs et al. ................... 398/51 |
| 5,777,761 | A  | * |  7/1998 | Fee .................................... 398/7 |
| 7,298,974 | B2 | * | 11/2007 | Tanobe et al. ................... 398/63 |
| 7,570,844 | B2 | * |  8/2009 | Handelman ..................... 385/14 |

(Continued)

FOREIGN PATENT DOCUMENTS

| JP | 2001-060922 | 3/2001 |
| JP | 2001-346235 | 12/2001 |

(Continued)

OTHER PUBLICATIONS

JPOA—Office Action of Japanese Patent Application No. 2011-159674 dated Jun. 2, 2015, with English translation of the relevant part, p. 1 line 27 to p. 2 line 6 of the Office Action.

*Primary Examiner* — Hibret Woldekidan
(74) *Attorney, Agent, or Firm* — Fujitsu Patent Center

(57) ABSTRACT

An optical network includes: an optical switch; a plurality of optical interface devices provided respectively for a plurality of servers and connected to the optical switch; and a manager to manage communication traffic of the plurality of servers. Each of the optical interface devices includes a fixed-wavelength optical transmitter and a wavelength tunable optical transmitter. A first optical path is set up via the optical switch by using the fixed-wavelength optical transmitters of the plurality of optical interface devices. The manager identifies first and second optical interface devices from among the plurality of optical interface devices in accordance with the communication traffic of the plurality of servers. A second optical path is set up between the first and second optical interface devices via the optical switch by using the wavelength tunable optical transmitters of the first and second optical interface devices.

9 Claims, 15 Drawing Sheets

(56) References Cited

U.S. PATENT DOCUMENTS

| | | | |
|---|---|---|---|
| 8,630,541 B2* | 1/2014 | Kawasaki | 398/69 |
| 2002/0015551 A1* | 2/2002 | Tsuyama et al. | 385/17 |
| 2002/0197007 A1* | 12/2002 | Liu | 385/24 |
| 2005/0207756 A1* | 9/2005 | Tanaka et al. | 398/85 |
| 2012/0008945 A1* | 1/2012 | Singla et al. | 398/49 |
| 2012/0076496 A1* | 3/2012 | Yamashita | 398/68 |
| 2013/0236169 A1* | 9/2013 | Gaudette et al. | 398/25 |

FOREIGN PATENT DOCUMENTS

| | | |
|---|---|---|
| JP | 2002-101432 | 4/2002 |
| WO | WO-2004/073225 A1 | 8/2004 |

* cited by examiner

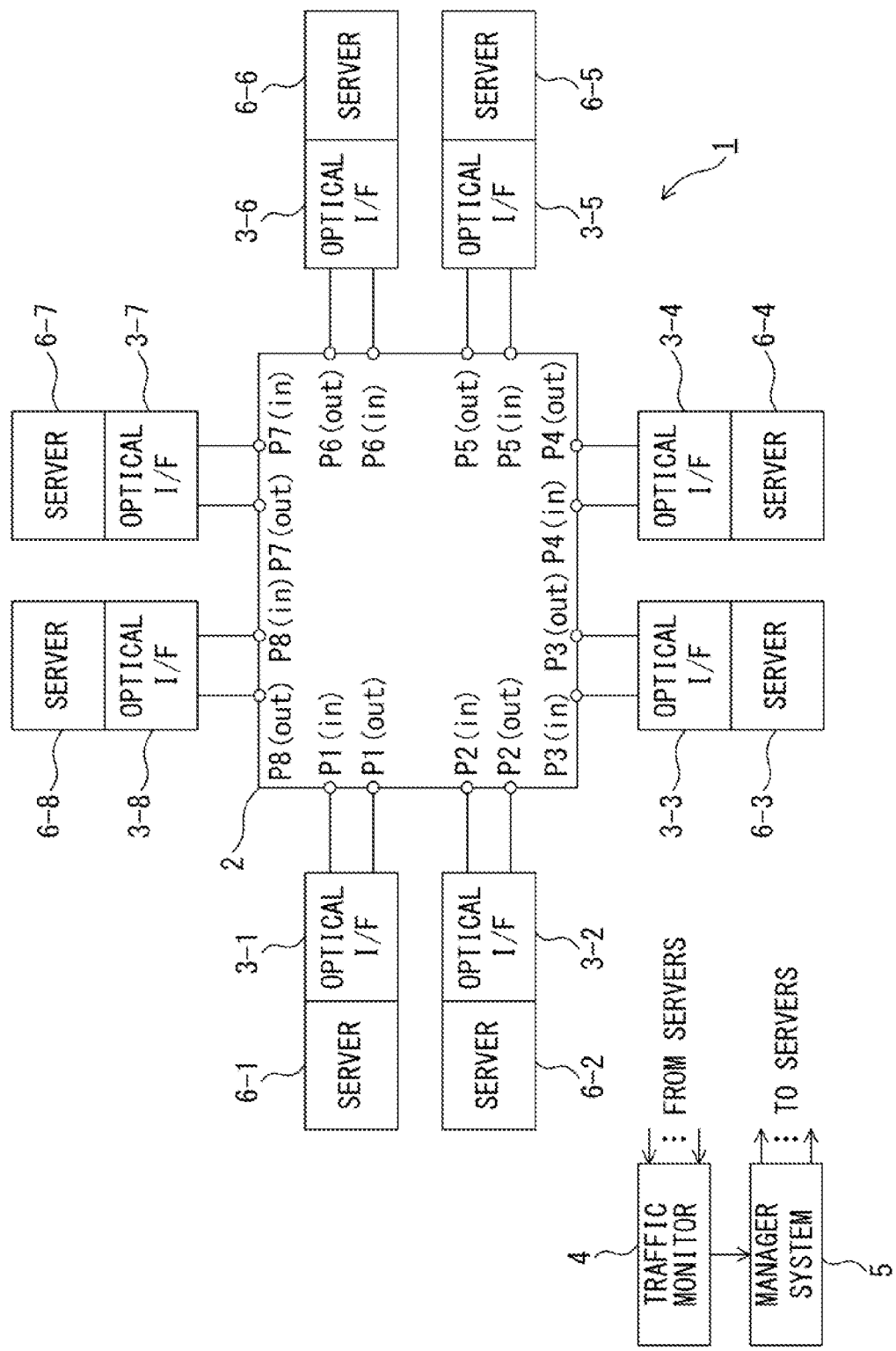
F I G. 1

|     | Out1 | Out2 | Out3 | Out4 | Out5 | Out6 | Out7 | Out8 |
|-----|------|------|------|------|------|------|------|------|
| In1 |      | λ7   | λ8   | λ1   | λ2   | λ3   | λ4   | λ5   |
| In2 | λ7   |      | λ1   | λ2   | λ3   | λ4   | λ5   | λ6   |
| In3 | λ8   | λ1   |      | λ3   | λ4   | λ5   | λ6   | λ7   |
| In4 | λ1   | λ2   | λ3   |      | λ5   | λ6   | λ7   | λ8   |
| In5 | λ2   | λ3   | λ4   | λ5   |      | λ7   | λ8   | λ1   |
| In6 | λ3   | λ4   | λ5   | λ6   | λ7   |      | λ1   | λ2   |
| In7 | λ4   | λ5   | λ6   | λ7   | λ8   | λ1   |      | λ3   |
| In8 | λ5   | λ6   | λ7   | λ8   | λ1   | λ2   | λ3   |      |

F I G. 2

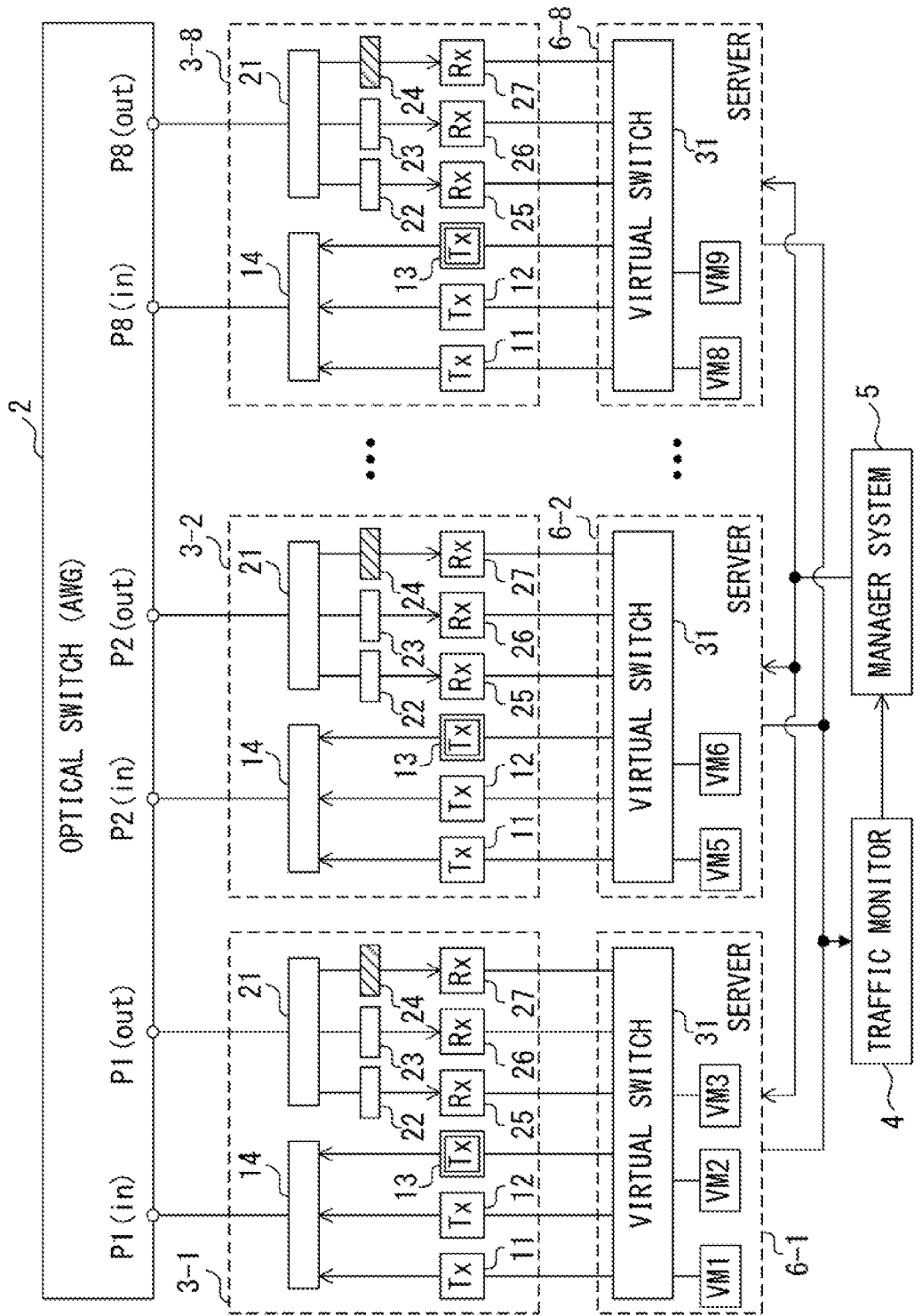
F I G. 3

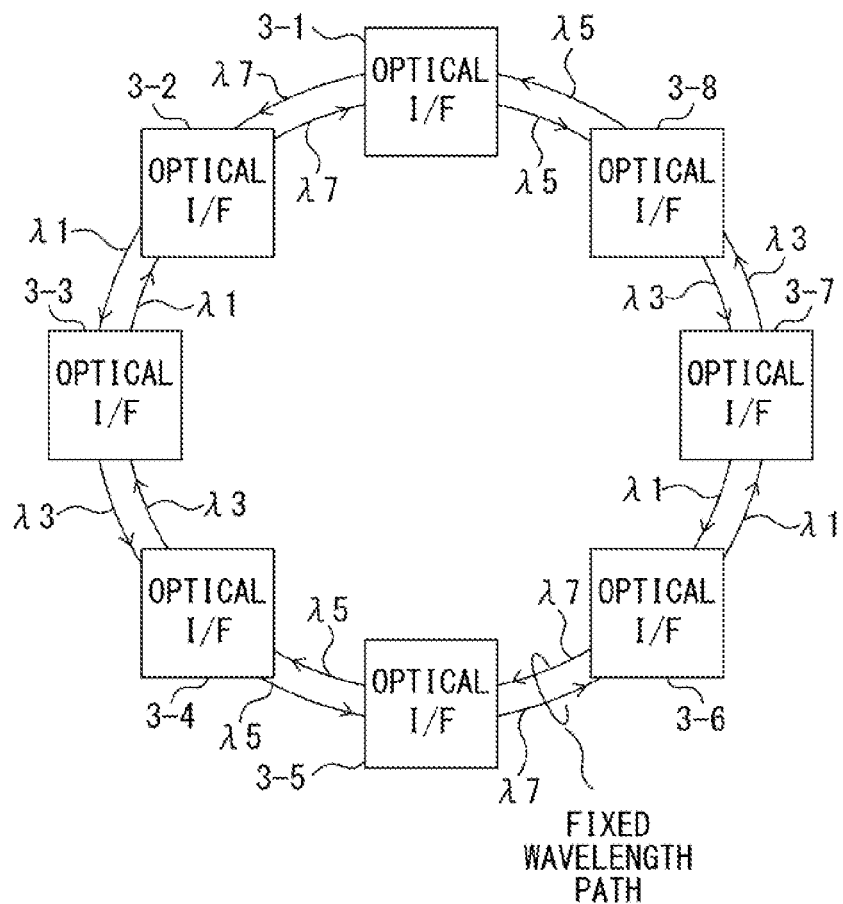
F I G. 4

| SOURCE | DESTINATION | BANDWIDTH | PRIORITY ... |
|---|---|---|---|
| VM5 | VM1 | 10 | |
| VM5 | VM2 | 0 | |
| VM5 | VM3 | 0 | |
| VM5 | VM8 | 100 | |
| VM5 | VM9 | 0 | |
| VM6 | VM1 | 10 | |
| ⋮ | ⋮ | | |
| VM8 | VM1 | 10 | |
| VM8 | VM2 | 0 | |
| VM8 | VM3 | 0 | |
| VM8 | VM5 | 90 | |
| VM8 | VM6 | 10 | |
| VM9 | VM1 | 0 | |
| ⋮ | ⋮ | | |

F I G. 5

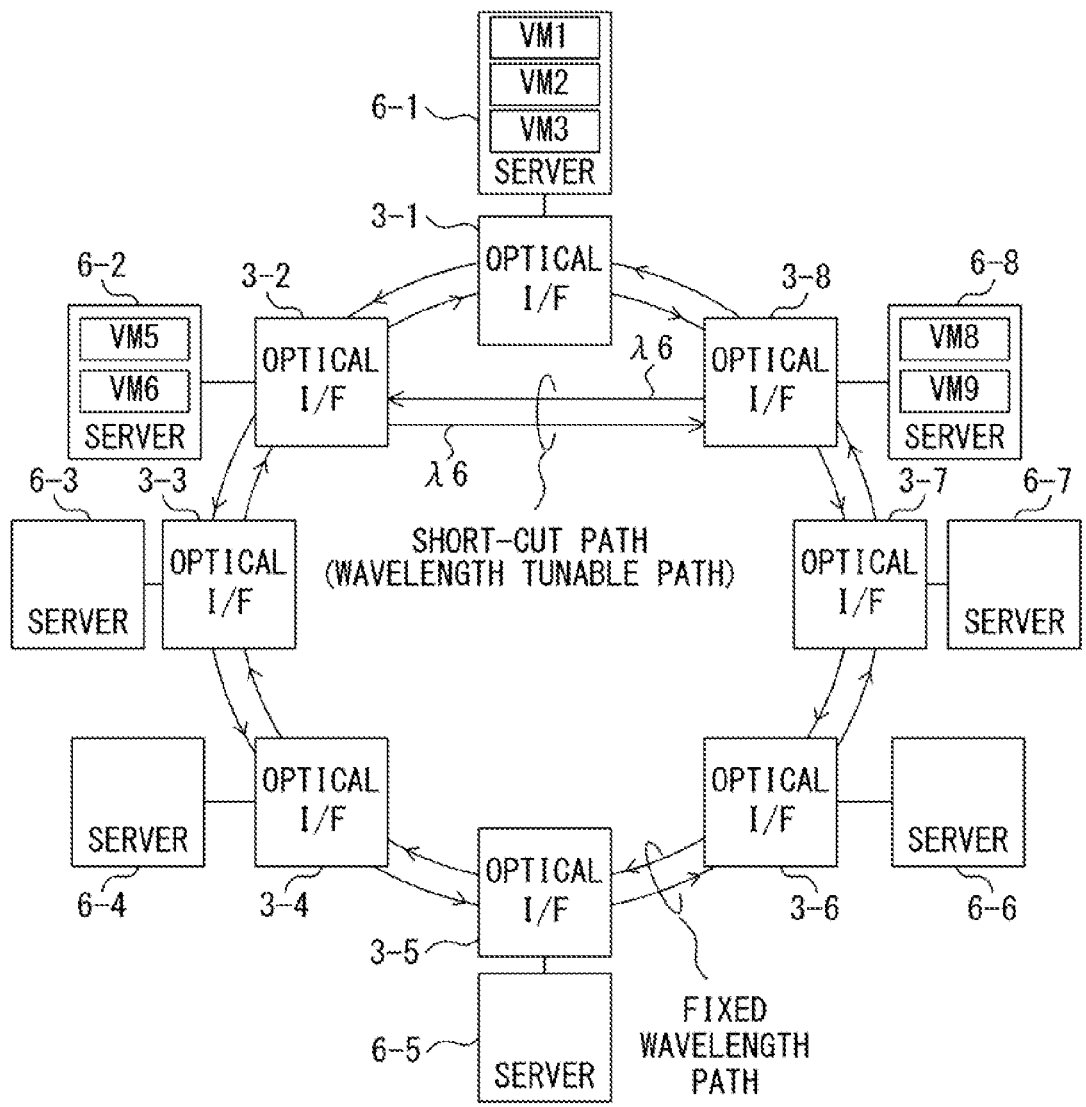
F I G. 6

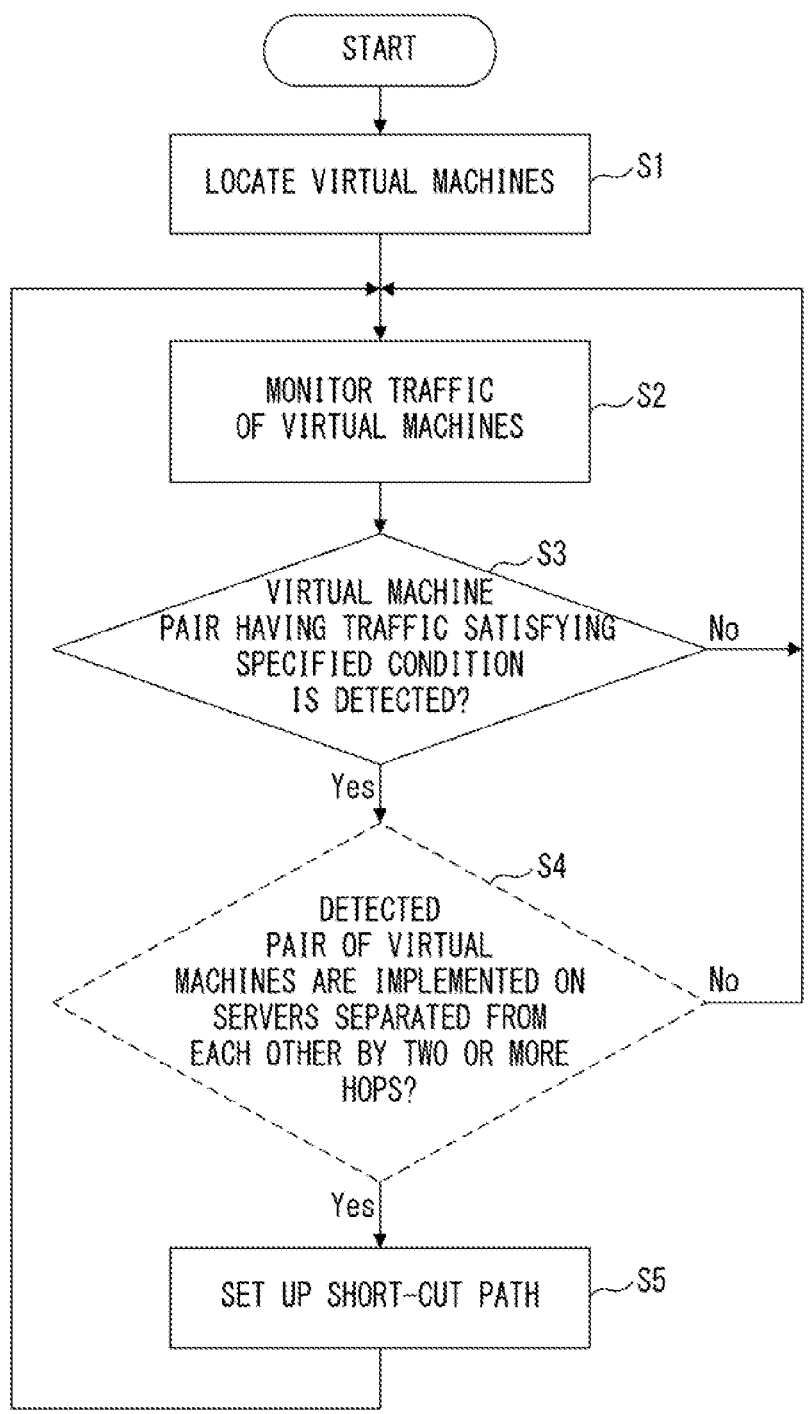
F I G. 9

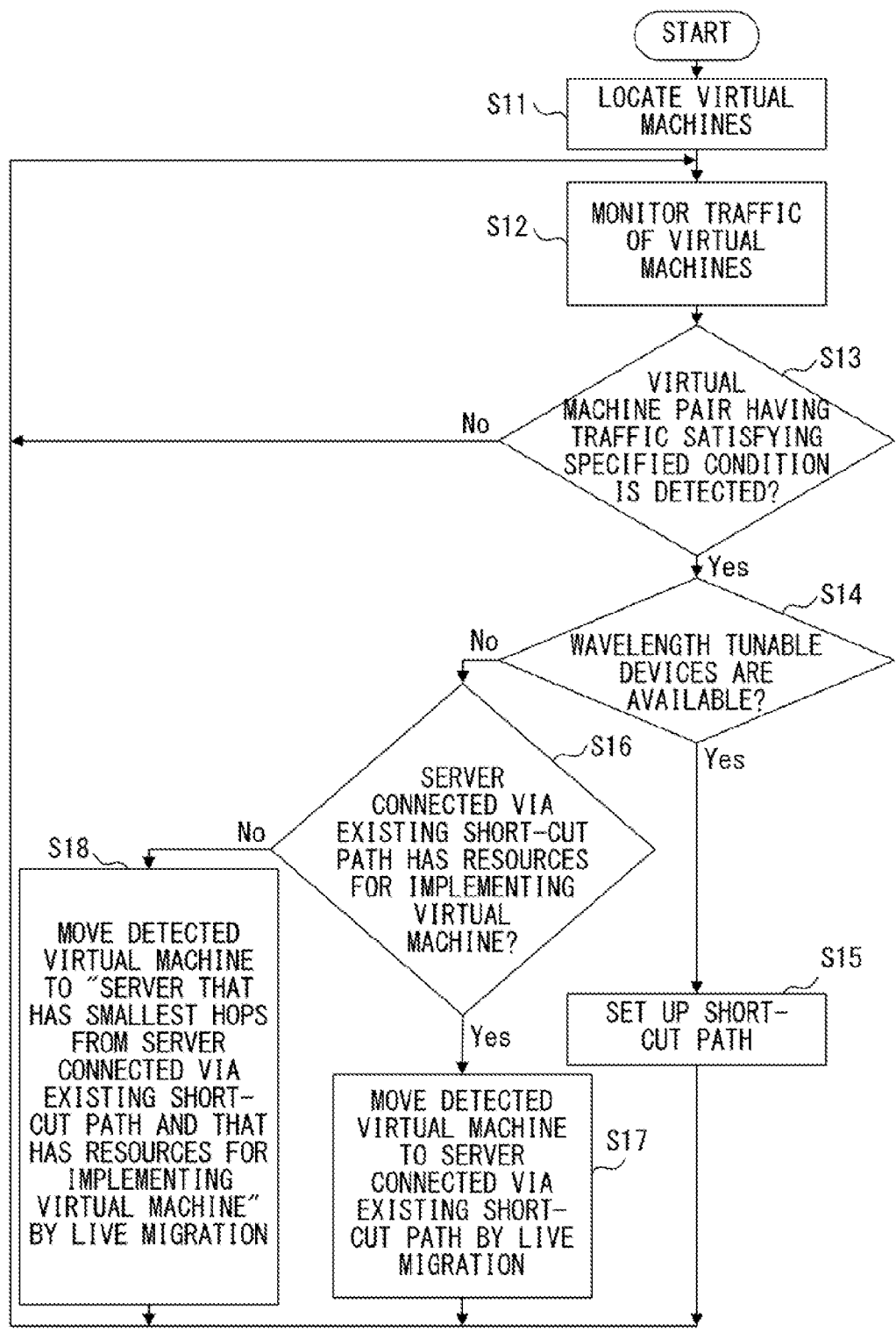
F I G. 1 1

OPTICAL NETWORK AND OPTICAL PATH SETUP METHOD

CROSS-REFERENCE TO RELATED APPLICATION

This application is based upon and claims the benefit of priority of the prior Japanese Patent Application No. 2011-159674, filed on Jul. 21, 2011, the entire contents of which are incorporated herein by reference.

FIELD

The embodiments described herein are related to an optical network and an optical path setup method for connecting a plurality of computers.

BACKGROUND

As cloud computing is becoming more popular, communication traffic in data centers is increasing. Accordingly, the speedup of interfaces accommodating huge communication traffic has been desired. Optical path setup technologies for interconnecting servers via optical links have been developed for data centers and so on.

As one optical interconnect technology, an optical communication network for interconnecting a plurality of communication nodes has been proposed. The optical communication network includes an arrayed waveguide grating (AWG). The AWG has N input ports and N output ports and has a routing function for guiding input light to a corresponding output port according to a wavelength of the input light. M (M is smaller than or equal to N) communication node equipments are connected to the AWG via optical transmission lines. To dynamically change a logical network topology representing the geometry of the path of signal light used for data transmission and reception between the communication node equipments, each of the communication node equipments includes wavelength switching means for switching the wavelength of the signal light. (For example, WO 2004/073225)

As a related art, Japanese Laid-open Patent Publication No. 2001-60922 describes a network interconnecting a plurality of nodes using a WDM system and an AWG. Japanese Laid-open Patent Publication No. 2002-101432 describes an optical switch network and an optical crossconnect.

In an optical network in which a plurality of node equipments are connected in a star configuration by an AWG, it is preferable that the node equipments be one-hop connected to enhance the efficiency of the data transmission between the node equipments. To one-hop connect optional node equipments to each other, it is logically necessary to adopt a full mesh topology.

To achieve such a network, however, each node equipment needs to include many optical devices. As an example, to connect N node equipments in a full mesh topology by using an N×N AWG, each node equipment needs to include N–1 transmitters for transmitting N–1 different wavelengths and N–1 receivers for receiving the N–1 wavelengths.

As described above, in the prior art, a transceiver of each node needs to include many optical devices to enhance the efficiency of the data transmission between the node equipments. Accordingly, the power consumption of a node equipment increases. The size of a transceiver increases and cost of the transceiver also increases.

SUMMARY

According to an aspect of the invention, an optical network includes: an optical switch, that has a plurality of input ports and a plurality of output ports, to guide an input optical signal to an output port corresponding to a combination of an input port at which the input optical signal has reached and a wavelength of the input optical signal; a plurality of optical interface devices provided respectively for a plurality of servers and connected to the optical switch; and a manager to manage communication traffic of the plurality of servers, wherein each of the optical interface devices includes a fixed-wavelength optical transmitter and a wavelength tunable optical transmitter, a first optical path is set up via the optical switch by using the fixed-wavelength optical transmitters of the plurality of optical interface devices, the manager identifies first and second optical interface devices from among the plurality of optical interface devices in accordance with the communication traffic of the plurality of servers, a second optical path is set up between the first and second optical interface devices via the optical switch by using the wavelength tunable optical transmitters of the first and second optical interface devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates an example of an optical network.

FIG. 2 illustrates an example of the operation of an optical switch.

FIG. 3 illustrates a configuration and operation of an optical network.

FIG. 4 illustrates a logical topology established by fixed wavelength paths.

FIG. 5 illustrates an exemplary monitoring result collected by a traffic monitor.

FIG. 6 illustrates an example of a short-cut path.

FIG. 9 is a flowchart indicating the process for setting up a short-cut path.

FIG. 11 is a flowchart illustrating a method for using a short-cut path and the live migration.

DESCRIPTION OF EMBODIMENTS

Figure 7:
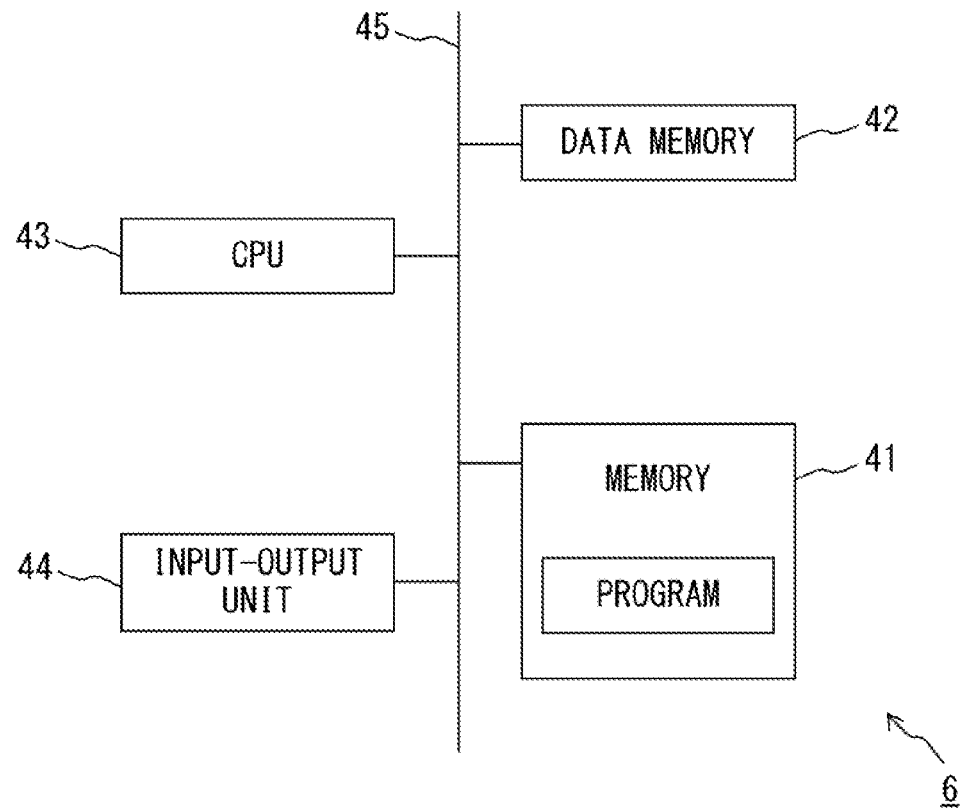
FIG. 7 illustrates a hardware configuration of a server.

FIG. 1 illustrates an example of an optical network in accordance with an embodiment. An optical network 1 in accordance with the embodiment connects a plurality of computers. The optical network 1 is used in, but is not particularly limited to, a data center. In this case, the computers are server computers (hereinafter referred to as "servers") 6-1 to 6-8. The optical network 1 includes an optical switch 2, optical interface devices 3-1 to 3-8, a traffic monitor 4, and a manager system 5.

The optical switch 2 has a plurality of input ports P1 (in) to P8 (in) and a plurality of output ports P1 (out) to P8 (out).

When the optical switch 2 receives an optical signal via a certain input port, the optical switch 2 guides the input optical signal to an output port corresponding to the combination of the input port and the wavelength of the optical signal. This operation may be achieved by an AWG (Arrayed Waveguide Grating). That is, the optical switch 2 is achieved by, for example, an 8×8 AWG.

FIG. 2 illustrates an example of the operation of the optical switch 2. In FIG. 2, In1 to In8 indicate the input ports P1 (in) to P8 (in), respectively. Out1 to Out8 indicate the output ports P1 (out) to P8 (out), respectively.

In the example illustrated in FIG. 2, when, for example, an optical signal with wavelength λ7 is input to the input port P1 (in), the optical switch 2 outputs this optical signal via the output port P2 (out). When an optical signal with wavelength λ8 is input to the input port P1 (in), the optical switch 2 outputs this optical signal via the output port P3 (out). The input/output relationship in FIG. 2 indicates the operation of a cyclic AWG.

The optical switch 2 may process each optical signal contained in a WDM optical signal. That is, when, for example, a WDM optical signal containing wavelength λ7 and wavelength λ8 is input to the input port P1 (in), the optical switch 2 outputs the optical signal with wavelength λ7 via the output port P2 (out) and outputs the optical signal with wavelength λ8 via the output port P3 (out).

The optical interface devices 3-1 to 3-8 are provided for the servers 6-1 to 6-8, respectively. The optical interface devices 3-1 to 3-8 are connected in a star configuration to the optical switch 2 via optical fibers. The optical interface devices 3-1 to 3-8 are respectively connected to the input ports P1 (in) to P8 (in) and the output ports P1 (out) to P8 (out) of the optical switch 2. As an example, the optical interface device 3-1 is connected to the input port P1 (in) and the output port P1 (out). The optical interface device 3-2 is connected to the input port P2 (in) and the output port P2 (out). The optical interface devices 3-1 to 3-8 transmit and receive data between the servers 6-1 to 6-8 via the optical switch 2.

The optical interface devices 3-1 to 3-8 may be installed outside of their corresponding servers 6-1 to 6-8. The optical interface devices 3-1 to 3-8 may be installed within their corresponding servers 6-1 to 6-8.

The traffic monitor 4 monitors the traffic of data transmitted by each of the servers 6-1 to 6-8. In this example, one or more virtual machines may be operated on each of the servers 6-1 to 6-8. In this case, the traffic monitor 4 may monitor the traffic of each virtual machine. The traffic monitor 4 reports a monitoring result to the manager system 5.

According to the monitoring result reported by the traffic monitor 4, the manager system 5 determines whether a wavelength tunable path (this will be described hereinafter) should be set up or not. To set up a wavelength tunable path, the manager system 5 generates a wavelength selection instruction representing a wavelength for achieving the wavelength tunable path for corresponding optical interface devices. The wavelength selection instruction is given to the corresponding optical interface devices.

The servers 6-1 to 6-8 are physical servers. The servers 6-1 to 6-8 are, for example, computers that provide service in response to a request from a client (not illustrated). When, for example, a request from a client is processed by a plurality of servers, data communication is performed between these servers. Also, when information of a client is stored in a plurality of servers, data communication is performed between these servers in response to a request from the client.

Such a data communication between servers is performed via the optical switch 2 and corresponding optical interface devices.

FIG. 3 illustrates the configuration and operation of the optical network 1. In this example, the optical interface devices 3-1 to 3-8 are provided outside the servers 6-1 to 6-8, respectively.

The configurations of the optical interface devices 3-1 to 3-8 are substantially identical with each other. Hereinafter, accordingly, the configuration and operation of the optical interface device 3-1 will be described as an example.

The optical interface device 3-1 has an optical transmitter module and an optical receiver module. The optical transmitter module and the optical receiver module do not need to be separated from each other. That is, the optical transmitter module and the optical receiver module may be mounted on, for example, a single board.

The optical transmitter module has fixed-wavelength optical transmitters 11 and 12, a wavelength tunable optical transmitter 13, and an optical coupler 14. Transmission data generated by the server 6-1 is provided to the optical transmitter module.

Each of the fixed-wavelength optical transmitters 11 and 12 generates an optical signal with a specified wavelength. The wavelengths used by the fixed-wavelength optical transmitters 11 and 12 are different from each other. Each of the fixed-wavelength optical transmitters 11 and 12 generates an optical signal from the transmission data provided by the server 6-1.

The wavelength tunable optical transmitter 13 includes a wavelength tunable light source, and controls the wavelength of carrier light in accordance with the wavelength selection instruction generated by the manager system 5. Here, the wavelength used by the wavelength tunable optical transmitter 13 is different from wavelengths of the fixed-wavelength optical transmitters 11 and 12. The wavelength tunable optical transmitter 13 generates an optical signal from the transmission data provided by the server 6-1.

The optical coupler 14 multiplexes the optical signals output from the fixed-wavelength optical transmitters 11 and 12 and the wavelength tunable optical transmitter 13. The optical coupler 14 is, for example, a WDM coupler. The optical signal output from the optical coupler 14 is guided to the input port P1 (in) of the optical switch 2.

The optical receiver module has an optical splitter 21, fixed-wavelength filters 22 and 23, a wavelength tunable filter 24, and photo detectors 25 to 27. The optical splitter 21 branches the optical signal received from the output port P1 (out) of the optical switch 2 and guides the branched signals to the fixed-wavelength filters 22 and 23 and the wavelength tunable filter 24. The optical splitter 21 is, for example, an optical power splitter.

Each of the fixed-wavelength filters 22 and 23 passes an optical signal with a specified wavelength. The passing wavelengths (i.e., transmitted wavelengths) of the fixed-wavelength filters 22 and 23 are different from each other. The optical signals output from the fixed-wavelength filters 22 and 23 are guided to photo detectors 25 and 26, respectively.

The wavelength tunable filter 24 controls the passing wavelength in accordance with a wavelength selection instruction generated by the manager system 5. The passing wavelength of the wavelength tunable filter 24 is different from wavelengths of the fixed-wavelength filters 22 and 23. The optical signal output from the wavelength tunable filter 24 is guided to the photo detector 27.

The photo detectors 25 and 26 respectively convert the optical signals that have passed through the fixed-wavelength filters 22 and 23 into electric signals. That is, the fixed-wavelength filter 22 and the photo detector 25 are operated as a fixed-wavelength optical receiver. Similarly, the fixed-wavelength filter 23 and the photo detector 26 are also operated as a fixed-wavelength optical receiver. The photo detector 27 converts the optical signal that has passed through the wavelength tunable filter 24 into an electric signal. That is, the wavelength tunable filter 24 and the photo detector 27 are operated as a wavelength tunable optical receiver. The electric signals obtained by the photo detectors 25 to 27 are guided to the server 6-1. As a result, the server 6-1 recovers data from the signals output from the optical interface device 3-1.

The configurations and operations of the optical interface devices 3-2 to 3-8 are substantially the same as those of the optical interface device 3-1. However, the transmission wavelengths of the fixed-wavelength optical transmitters 11 and 12 of the optical interface devices 3-1 to 3-8 are specified in accordance with the input/output relationship of the optical switch 2 illustrated in FIG. 2, so as to provide an optical path for a bi-directional ring network. The passing wavelengths of the fixed-wavelength filters 22 and 23 of the optical interface devices 3-1 to 3-8 are specified in accordance with the input/output relationship of the optical switch 2 illustrated in FIG. 2, so as to terminate an optical path for a bi-directional ring network.

An example will be given in the following. In this example, the optical interface devices 3-1 to 3-8 achieve the bi-directional ring network illustrated in FIG. 4. FIG. 4 indicates a logical topology achieved by the optical switch 2 and the optical interface devices 3-1 to 3-8. The optical switch 2 provides the switching operation illustrated in FIG. 2.

In this case, in the optical interface device 3-1, wavelength $\lambda 7$ is assigned to the fixed-wavelength optical transmitter 11 and wavelength $\lambda 5$ is assigned to the fixed-wavelength optical transmitter 12. That is, the fixed-wavelength optical transmitters 11 and 12 of the optical interface device 3-1 transmit the optical signals with wavelengths $\lambda 7$ and $\lambda 5$, respectively. These optical signals are multiplexed by the optical coupler 14 and guided to the input port P1 (in) of the optical switch 2.

The optical switch 2 guides, to the output port P2 (out), an optical signal with wavelength $\lambda 7$ input via the input port P1 (in). Accordingly, this optical signal is transmitted to the optical interface device 3-2. That is, the optical signal transmitted from the fixed-wavelength optical transmitter 11 of the optical interface device 3-1 is guided to the optical interface device 3-2 by the optical switch 2. Meanwhile, the optical switch 2 guides, to the output port P8 (out), the optical signal with wavelength $\lambda 5$ input via the input port P1 (in). Accordingly, this optical signal is transmitted to the optical interface device 3-8. That is, the optical signal transmitted from the fixed-wavelength optical transmitter 12 of the optical interface device 3-1 is guided to the optical interface device 3-8 by the optical switch 2.

In the optical interface device 3-2, wavelength $\lambda 1$ is assigned to the fixed-wavelength optical transmitter 11 and wavelength $\lambda 7$ is assigned to the fixed-wavelength optical transmitter 12. That is, the fixed-wavelength optical transmitters 11 and 12 of the optical interface device 3-2 transmit the optical signals with wavelengths $\lambda 1$ and $\lambda 7$, respectively. These optical signals are multiplexed by the optical coupler 14 and guided to the input port P2 (in) of the optical switch 2.

The optical switch 2 guides, to the output port P3 (out), the optical signal with wavelength $\lambda 1$ input via the input port P2 (in). Accordingly, this optical signal is transmitted to the optical interface device 3-3. That is, the optical signal transmitted from the fixed-wavelength optical transmitter 11 of the optical interface device 3-2 is guided to the optical interface device 3-3 by the optical switch 2. Meanwhile, the optical switch 2 guides, to the output port P1 (out), the optical signal with wavelength $\lambda 7$ input via the input port P2 (in). Accordingly, this optical signal is transmitted to the optical interface device 3-1. That is, the optical signal transmitted from the fixed-wavelength optical transmitter 12 of the optical interface device 3-2 is guided to the optical interface device 3-1 by the optical switch 2.

The wavelengths of the fixed-wavelength optical transmitters 11 and 12 of the optical interface devices 3-3 to 3-8 are also assigned in accordance with similar policies. In the topology illustrated in FIG. 4, accordingly, the optical signal output from the fixed-wavelength optical transmitter 11 of each of the optical interface devices 3-1 to 3-8 is transmitted to the adjacent optical interface device provided in the counterclockwise direction. Also in the topology illustrated in FIG. 4, the optical signal output from the fixed-wavelength optical transmitter 12 of each of the optical interface devices 3-1 to 3-8 is transmitted to the adjacent optical interface device provided in the clockwise direction.

In the topology in FIG. 4, the passing wavelength of the fixed-wavelength filter 22 of each of the optical interface devices 3-1 to 3-8 is set such that optical signal transmitted in the counterclockwise direction is received. As an example, the passing wavelength of the fixed-wavelength filter 22 of the optical interface device 3-1 is set to $\lambda 5$ such that the optical signal transmitted from the fixed-wavelength optical transmitter 11 of the optical interface device 3-8 is received. Also in the topology in FIG. 4, the passing wavelength of the fixed-wavelength filter 23 of each of the optical interface devices 3-1 to 3-8 is set such that optical signal transmitted in the clockwise direction is received. As an example, the passing wavelength of the fixed-wavelength filter 23 of the optical interface device 3-1 is set to $\lambda 7$ such that the optical signal transmitted from the fixed-wavelength optical transmitter 12 of the optical interface device 3-2 is received.

In this way, the bi-directional ring network illustrated in FIG. 4 is established by appropriately setting the transmission wavelengths of the fixed-wavelength optical transmitters 11 and 12 of the optical interface devices 3-1 to 3-8 and the passing wavelengths of the fixed-wavelength filters 22 and 23 of the optical interface devices 3-1 to 3-8. Accordingly, the servers 6-1 to 6-8 can transmit data to another desired server using the optical network 1.

As an example, when the server 6-1 transmits data to the server 6-3, the server 6-1 provides data to which "destination is server 6-3" has been added to the fixed-wavelength optical transmitter 11 of the optical interface device 3-1. As a result, the data is transmitted by an optical signal with wavelength $\lambda 7$ and guided to the optical interface device 3-2 via the optical switch 2. In the optical interface device 3-2, the passing wavelength of the fixed-wavelength filter 22 is set to $\lambda 7$ such that the optical signal from the optical interface device 3-1 is received. Accordingly, the server 6-2 receives the data transmitted by the optical signal with wavelength $\lambda 7$.

However, the destination of the data is not the server 6-2. Accordingly, the server 6-2 does not obtain the data, but provides the data to the fixed-wavelength optical transmitter 11 of the optical interface device 3-2. As a result, the data is transmitted by an optical signal with wavelength $\lambda 1$ and guided to the optical interface device 3-3 via the optical switch 2. In the optical interface device 3-3, the passing wavelength of the fixed-wavelength filter 22 is set to $\lambda 1$ such that the optical signal from the optical interface device 3-2 is received. Accordingly, the server 6-3 receives the data transmitted by the optical signal with wavelength λ1. The server 6-3 obtains the data since the destination of the data is the server 6-3.

Each of the servers 6-1 to 6-8 has a virtual switch 31. The virtual switch 31 is achieved by software implemented on a physical server. The virtual switch 31 guides the transmission data to the fixed-wavelength optical transmitter 11 or 12 according to the destination of transmission data. In accordance with an instruction from the manager system 5, the virtual switch 31 may guide the transmission data to the wavelength tunable optical transmitter 13. In addition, according to the destination of the data received from a corresponding optical interface device, the virtual switch 31 routes the received data. As an example, when a destination of received data is the server 6-1, the virtual switch 31 of the server 6-1 passes the received data to a corresponding virtual machine on the server 6-1. When a destination of received data is not the server 6-1, the virtual switch 31 of the server 6-1 returns the received data to the optical interface device 3-1.

Each of the servers 6-1 to 6-8 may implement one or more virtual machines (VMs). In the example illustrated in FIG. 3, virtual machines VM1 to VM3 are operating on the server 6-1, virtual machines VM5 and VM6 are operating on the server 6-2, and virtual machines VM8 and VM9 are operating on the server 6-8. Each of the virtual machines can communicate with another virtual machine. Meanwhile, each of the virtual machines can transmit data to virtual machines implemented on other servers. In this case, data transmitted from a virtual machine is transmitted via the optical switch 2 as described above. Information for identifying a source virtual machine and information for identifying a destination virtual machine are added to data transmitted between the virtual machines. The information for identifying the virtual machines is, for example, a virtual MAC address.

The virtual switch 31 has a port mirror function. In this example, the port mirror function copies data to be transmitted to a corresponding optical interface device and outputs the copy to a monitor port.

The traffic monitor 4 monitors the traffic of data transmitted by each virtual machine. In this case, the traffic monitor 4 monitors the traffic by, for example, using the copy data output via the monitor port by the port mirror function of the virtual switch 31. The traffic monitor 4 does not need to monitor the traffic between virtual machines implemented within the same server. The traffic monitor 4 may monitor the traffic with respect to a pair of a source virtual machine and a destination virtual machine.

The traffic monitor 4 monitors, for example, the bandwidth of traffic between the virtual machines and the traffic priority between the virtual machines. The bandwidth of traffic is a transmission rate. When data is transmitted between the virtual machines with fixed-length packets, the bandwidth is detected by counting the number of the packets. In the case of data packets with variable lengths, the bandwidth may be detected by analyzing the header of each packet to obtain the payload length. The traffic priority is set in advance in accordance with, for example, allowable delay. As an example, the priority of moving picture and/or data containing voice is high. The traffic priority is set in, for example, the header of each packet. In addition to the bandwidth and the priority, the traffic monitor 4 may monitor other traffic characteristics (e.g., occurrence frequency and duration).

The traffic monitor 4 monitors the traffic of the servers 6-1 to 6-8. Accordingly, in order to decrease the load on the traffic monitor 4, the port mirror function of the virtual switch 31 of each of the servers 6-1 to 6-8 may send sampled data to the traffic monitor 4 at regular intervals.

FIG. 5 illustrates an exemplary monitoring result collected by the traffic monitor 4. In this example, for simplicity, the bandwidth between the virtual machines is monitored. In the example illustrated in FIG. 5, a large volume of data is transmitted from the virtual machine VM5 to the virtual machine VM8. A large volume of data is also transmitted from the virtual machine VM8 to the virtual machine VM5. The traffic monitor 4 reports the monitoring result to the manager system 5.

The manager system 5 sets up a short-cut path according to the characteristics of the traffic between the virtual machines obtained by the traffic monitor 4. Meanwhile, the manager system 5 calculates, for example, the correlation on bi-directional traffic between the virtual machines. The manager system 5 then sets up a short-cut path between a pair of virtual machines having a high correlation. In the example illustrated in FIG. 5, the bandwidth of the traffic from the virtual machine VM5 to the virtual machine VM8 and the bandwidth of the traffic from the virtual machine VM8 to the virtual machine VM5 are both large and approximately the same. In this case, the manager system 5 sets up a short-cut path for transmitting data between the virtual machines VM5 and VM8.

The manager system 5 may consider other traffic characteristics (e.g., priority, occurrence frequency, and duration) to calculate the correlation between traffic between the virtual machines. Without calculating the correlation between traffic, the manager system 5 may set up a short-cut path for traffic with a large bandwidth. As an example, in the example illustrated in FIG. 5, the average traffic between the virtual machines VM5 and VM8 is "95", which is larger than that between the other virtual machine pairs. In this case, the manager system 5 may set up a short-cut path for transmitting data between the virtual machines VM5 and VM8.

To set up a short-cut path, the manager system 5 transmits a setup instruction to a corresponding server. In the aforementioned example, the manager system 5 transmits a setup instruction to the server 6-2 on which the virtual machine VM5 is implemented and the server 6-8 on which the virtual machine VM8 is implemented.

In the following, the process for setting up a short-cut path between the virtual machines VM5 and VM8 will be described. In this case, the manager system 5 transmits the following instructions to the server 6-2.

(1) The virtual switch 31 guides transmission data from the virtual machine VM5 to the wavelength tunable optical transmitter 13.
(2) The transmission wavelength of the wavelength tunable optical transmitter 13 is λ6 (Wavelength selection instruction).
(3) The passing wavelength of the wavelength tunable filter 24 is λ6 (Wavelength selection instruction).

The manager system 5 also transmits the following instructions to the server 6-8.

(1) The virtual switch 31 guides the transmitted data from the virtual machine VM8 to the wavelength tunable optical transmitter 13.
(2) The transmission wavelength of the wavelength tunable optical transmitter 13 is λ6 (Wavelength selection instruction).
(3) The passing wavelength of the wavelength tunable filter 24 is λ6 (Wavelength selection instruction).

In accordance with the instruction from the manager system 5, the servers 6-2 and 6-8 each change the setting of the virtual switch 31. The servers 6-2 and 6-8 respectively guide the wavelength selection instructions from the manager system 5 to the corresponding optical interface devices 3-2 and 3-8. As a result, in accordance with the wavelength selection instructions, each of the optical interface devices 3-2 and 3-8 controls the transmission wavelength of the wavelength tunable optical transmitter 13 and the passing wavelength of the wavelength tunable filter 24.

The aforementioned short-cut path is used as follows. When the virtual machine VM5 generates data D1 addressed to the virtual machine VM8, the virtual switch 31 of the server 6-2 guides the data D1 to the wavelength tunable optical transmitter 13 of the optical interface device 3-2. The wavelength tunable optical transmitter 13 generates an optical signal S1 for transmitting the data D1. The carrier wavelength of the optical signal S1 is λ6. The optical signal S1 is transmitted to the optical switch 2 together with optical signals generated by the fixed-wavelength optical transmitters 11 and 12.

The WDM optical signal transmitted from the optical interface device 3-2 reaches the input port P2 (in) of the optical switch 2. In accordance with the wavelength of the input optical signal, the optical switch 2 guides the optical signal to a corresponding output port. When the optical switch 2 receives an optical signal with wavelength λ6 via the input port P2 (in), the optical switch guides this optical signal to the output port P8 (out). That is, the optical switch 2 guides the optical signal S1 to the output port P8 (out). Accordingly, the optical signal S1 transmitted from the optical interface device 3-2 is guided to the optical interface device 3-8 by the optical switch 2. The optical switch 2 also guides other optical signals input together with the optical signal S1 to other output ports corresponding to the wavelengths of these other optical signals.

The optical interface device 3-8 receives the optical signal S1 from the optical switch 2. Meanwhile, the optical interface device 3-8 also receives an optical signal with another wavelength together with the optical signal S1. That is, the optical interface device 3-8 receives a WDM optical signal containing the optical signal S1. In the optical interface device 3-8, this WDM optical signal is guided to the fixed-wavelength filters 22 and 23 and the wavelength tunable filter 24.

In accordance with the wavelength selection instruction described above, the passing wavelength of the wavelength tunable filter 24 of the optical interface device 3-8 is set to λ6. Accordingly, the wavelength tunable filter 24 selectively passes the optical signal S1 with wavelength λ6 contained in the input WDM optical signal. The optical signal S1 is converted into an electric signal by the photo detector 27 and is then guided to the server 6-8. The server 6-8 recovers the data D1 from the electric signal and provides the data D1 to the virtual machine VM8.

The operation for transmitting data D2 from the virtual machine VM8 to the virtual machine VM5 is substantially the same as that for transmitting the data D1 from the virtual machine VM5 to the virtual machine VM8. That is, using the wavelength tunable optical signaler 24, the optical interface device 3-8 generates an optical signal S2 with wavelength λ6 for transmitting the data D2. In the optical switch 2, the optical signal S2 is guided from the input port P8 (in) to the output port P2 (out). Accordingly, the optical signal S2 transmitted from the optical interface device 3-8 is guided to the optical interface device 3-2 by the optical switch 2.

The optical interface device 3-2 receives the WDM optical signal containing the optical signal S2 from the optical switch 2. Here, the passing wavelength of the wavelength tunable filter 24 of the optical interface device 3-2 is set to λ6 in accordance with the aforementioned wavelength selection instruction. Accordingly, the wavelength tunable filter 24 selectively passes the optical signal S2 with wavelength λ6 contained in the input WDM optical signal. The optical signal S2 is converted into an electric signal by the photo detector 27 and is then guided to the server 6-2. The server 6-2 recovers the data D2 from the electric signal and provides the data D2 to the virtual machine VM5.

FIG. 6 illustrates an exemplary short-cut path. In FIG. 6, a short-cut path is setup for transmitting data between the virtual machines VM5 and VM8 using the aforementioned procedures. The short-cut path connects the optical interface device 3-2 corresponding to the server 6-2 accommodating the virtual machine VM5 and the optical interface device 3-8 corresponding to the server 6-8 accommodating the virtual machine VM8. That is, the virtual machines VM5 and VM8 can transmit data to each other with one hop.

When the short-cut path is not set up, data is transmitted between the virtual machines VM5 and VM8 via the optical interface device 3-1. In this case, the virtual machines VM5 and VM8 transmit data to each other with two hops. That is, use of the short-cut path in accordance with the embodiment reduces transmission delay.

When a short-cut path is not set up to transmit data between the virtual machines VM5 and VM8, the resources used in the optical interface device 3-1 increases. Optical signals transmitted between the optical interface devices are always transmitted via the optical switch 2. Accordingly, when the short-cut path is not set up, the optical switch 2 switches an optical signal between the optical interface device 3-2 and the optical interface device 3-1, and switches an optical signal between the optical interface device 3-1 and the optical interface device 3-8 in order to transmit data between the virtual machines VM5 and VM8. Accordingly, the resources used in the optical switch 2 also increases. In other words, setting up a short-cut path decreases the resources used in the optical switch 2 and/or one or more optical interface devices, thereby enhancing the data transmission efficiency.

FIG. 7 illustrates the hardware configuration of a server. A server 6 illustrated in FIG. 7 represents the servers 6-1 to 6-8. The server 6 includes a memory 41, a data memory 42, a CPU 43, and an input-output unit 44. The memory 41, the data memory 42, the CPU 43, and the input-output unit 44 are connected to each other via, for example, a bus 45.

The memory 41 stores programs for controlling the operation of the server 6 (including a program for providing a virtual machine). The memory 41 is used when the CPU 43 executes a program. The data memory 42 temporarily stores transmission data and received data. The data memory 42 is also used to provide the virtual switch 31. In this case, the transmission data and the received data are temporarily stored in the data memory 42 and are read in accordance with the destination addresses.

The CPU 43 controls the operation of the server 6 by executing the programs stored in the memory 41. The CPU 43 may include a plurality of processors. The input-output unit 44 provides an interface to a corresponding optical interface device. The input-output unit 44 may transmit a copy of data processed by the virtual switch 31 to the traffic monitor 4. In this case, the input-output unit 44 provides the port mirror function. In addition, the input-output unit 44 receives instructions from the manager system 5.

Figure 8:
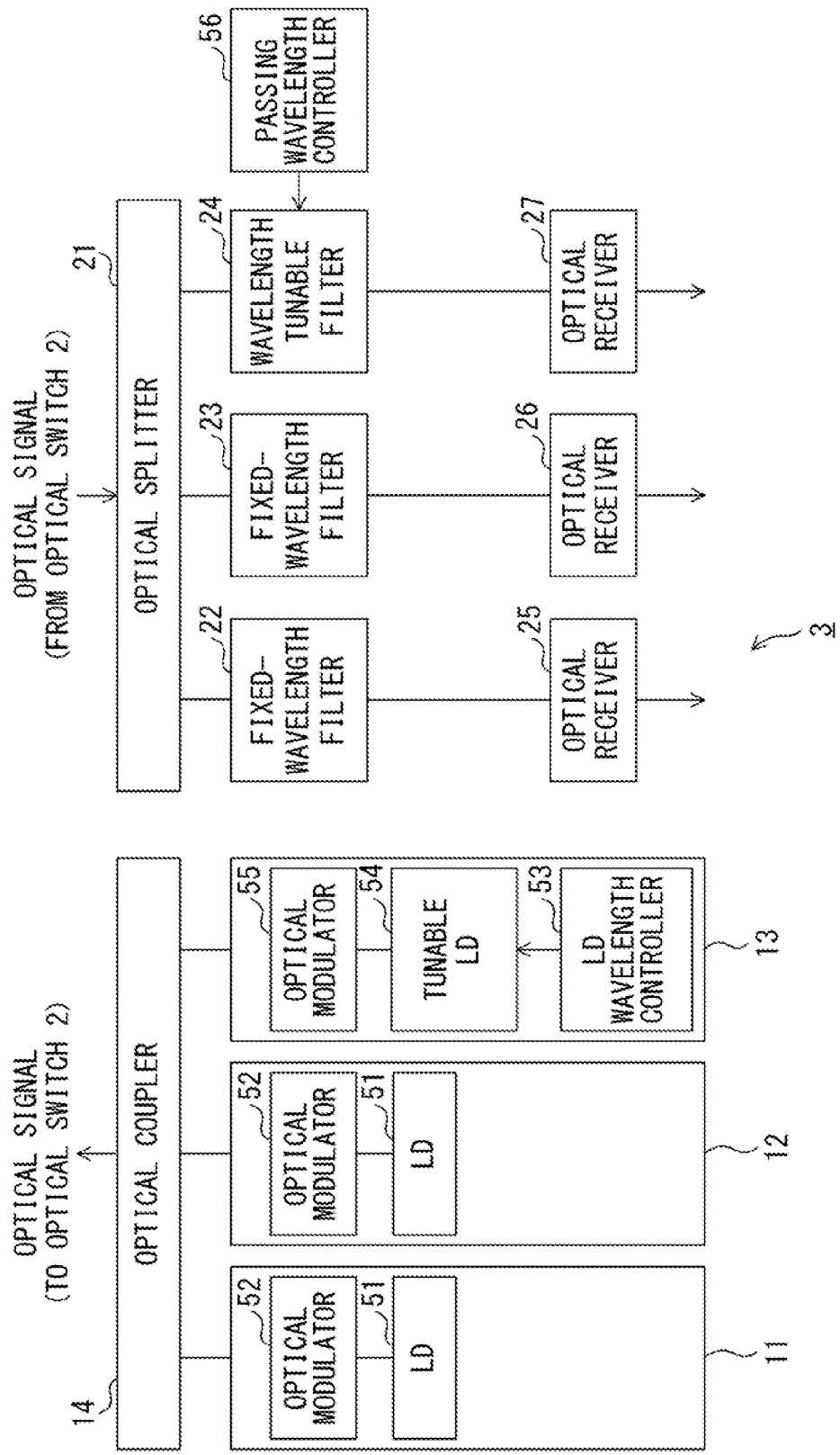
FIG. 8 illustrates a configuration of an optical interface device.

FIG. 8 illustrates the configuration of an optical interface device 3. The optical interface device 3 represents the optical interface devices 3-1 to 3-8. As described above with reference to FIG. 3, the optical interface device 3 includes the fixed-wavelength optical transmitters 11 and 12, the wavelength tunable optical transmitter 13, the optical coupler 14, the optical splitter 21, the fixed-wavelength filters 22 and 23, the wavelength tunable filter 24, and photo detectors 25 to 27.

Each of the fixed-wavelength optical transmitters 11 and 12 includes a laser light source (LD) 51 and an optical modulator 52. The laser light source 51 generates continuous wave light with a fixed wavelength. As an example, the laser light sources 51 of the fixed-wavelength optical transmitters 11 and 12 of the optical interface device 3-1 respectively generate continuous wave light with wavelengths λ7 and λ5. The optical modulator 52 generates an optical signal by modulating the continuous wave light with a data signal from the server.

The wavelength tunable optical transmitter 13 includes an LD wavelength controller 53, a tunable laser light source 54, and an optical modulator 55. The LD wavelength controller 53 controls the LD wavelength of the tunable laser light source 54 in accordance with a wavelength selection instruction from the manager system 5. Under the control of the LD wavelength controller 53, the tunable laser light source 54 generates continuous wave light with a wavelength designated by the wavelength selection instruction. The optical modulator 55 generates an optical signal by modulating the continuous wave signal with a data signal from the server.

The optical interface device 3 further includes a passing wavelength controller 56. The passing wavelength controller 56 controls the passing wavelength of the wavelength tunable filter 24 in accordance with a wavelength selection instruction from the manager system 5. Under the control of the passing wavelength controller 56, the wavelength tunable filter 24 passes an optical light with a wavelength designated by the wavelength selection instruction.

FIG. 9 is a flowchart indicating the process for setting up a short-cut path. The process indicated by the flowchart is performed by the manager system 5.

In S1, the manager system 5 locates virtual machines on servers. To implement a plurality of virtual machines associated with each other, the manager system 5 generates these virtual machines to be operated on the same server. However, the number of virtual machines that can be implemented on each server is sometimes determined in advance. Accordingly, a plurality of virtual machines associated with each other may be located on different servers. In this example, virtual machines are located by the manager system 5, but they do not necessarily need to be located by the manager system 5.

In S2, the manager system 5 collects the traffic characteristic of each virtual machine. However, the traffic of each virtual machine is monitored by the traffic monitor 4. That is, the manager system 5 obtains the monitoring results collected by the traffic monitor 4. An exemplary monitoring result collected by the traffic monitor 4 is described with reference to FIG. 5.

In S3, the manager system 5 determines whether there is a pair of virtual machines (first and second virtual machines implemented on different servers) having a traffic characteristic satisfying a specified condition. The specified condition is described in accordance with, for example, the level of correlation between the characteristic of the traffic from the first virtual machine to the second virtual machine and the characteristic of the traffic from the second virtual machine to the first virtual machine. In this case, a virtual machine pair having a correlation higher than a specified threshold level is detected. Alternatively, the specified condition is described in accordance with the volume of traffic (i.e., the bandwidth) between two virtual machines implemented on different servers. In this case, a virtual machine pair having a traffic volume greater than a specified threshold is detected.

When there is a virtual machine pair satisfying the specified condition, the manager system 5 performs the process of S4. Meanwhile, when there is no virtual machine pair satisfying the specified condition, the process of the manager system 5 returns to S2.

In S4, the manager system 5 determines whether the detected two virtual machines are implemented on servers separated from each other by two or more hops in the logical topology achieved by fixed wavelength paths. The logical topology achieved by the fixed wavelength paths is described with reference to FIG. 4. Assume, for example, that the virtual machines VM5 and VM8 in FIG. 3 satisfy the condition of S3. In this case, the server 6-2 on which the virtual machine VM5 is implemented and the server 6-8 on which the virtual machine VM8 is implemented are separated from each other by two hops in the logical topology achieved by the fixed wavelength paths indicated in FIG. 4.

When the two detected virtual machines are separated from each other by two or more hops, the manager system 5 performs the process of S5. Meanwhile, when the two detected virtual machines are not separated from each other by two or more hops, the process of the manager system 5 returns to S2. The manager system 5 does not necessarily need to perform the process of S4.

In S5, the manager system 5 transmits, to the corresponding servers, an instruction to set up a short-cut path for transmitting data between the virtual machines detected in S3. That is, the instruction is transmitted to the servers accommodating the virtual machines detected in S3. The instruction includes a wavelength selection instruction.

Each of the servers that has received the instruction to set up the short-cut path forwards the wavelength selection instruction to the corresponding optical interface device. Accordingly, the optical interface device controls the transmission wavelength of the wavelength tunable optical transmitters 13 in accordance with the wavelength selection instruction and controls the passing wavelength of the wavelength tunable filters 24 in accordance with the wavelength selection instruction. As a result, the short-cut path for transmitting data between the aforementioned virtual machines is set up.

Figure 10:
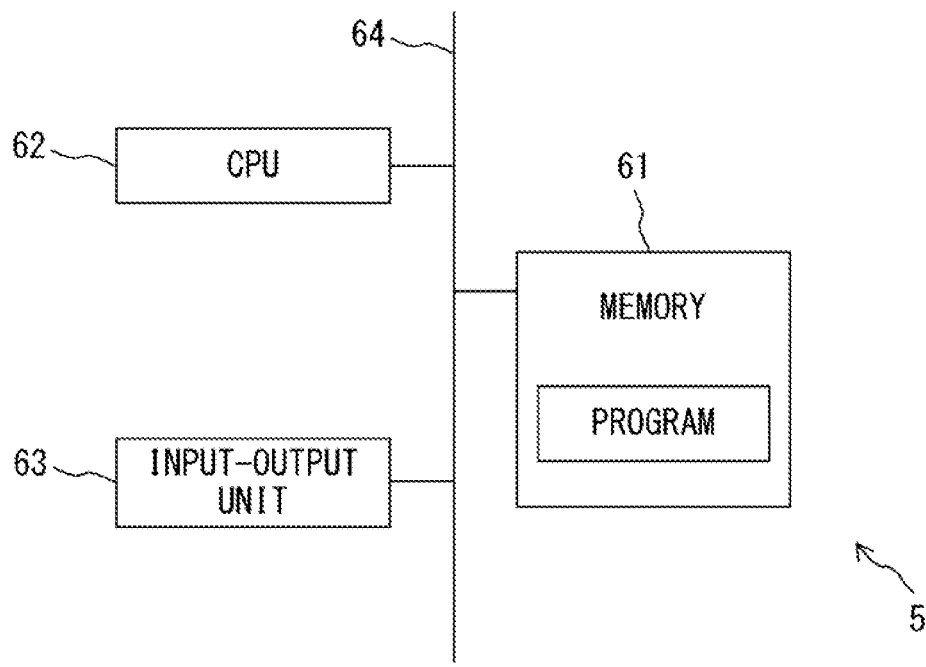
FIG. 10 illustrates a configuration of a manager system.

FIG. 10 illustrates the configuration of the manager system 5. The manager system 5 is achieved by a computer including a memory 61, a CPU 62, and an input-output unit 63. The memory 61 stores a program for controlling the operation of the manager system 5. The program describing the processes indicated in the flowchart in FIG. 9 is also stored in the memory 61. The memory 61 is used when the CPU 62 executes a program.

The CPU 62 controls the operation of the manager system 5 by executing the program stored in the memory 61. The CPU 62 may include a plurality of processors. The input-output unit 63 provides an interface to the servers 6-1 to 6-8. Instructions to set up a short-cut path (including wavelength selection instruction) are transmitted via the input-output unit 63 to the corresponding servers 6-1 to 6-8.

In FIG. 1 and FIG. 3, the traffic monitor 4 and the manager system 5 are separated from each other, but they may be achieved by one computer. In this case, the memory 61 also stores a program for monitoring the traffic of the servers 6-1 to 6-8 (or the traffic of virtual machines). The CPU 62 also performs the process of monitoring traffic.

As described above, in the optical network and the optical path setup method in accordance with the embodiment, not only a fixed wavelength path for transmitting data between servers but also a short-cut path (or a wavelength tunable path) is set up as necessary. Accordingly, in comparison with the optical network in FIG. 4 in which only fixed wavelength paths are set up, the optical network in accordance with the embodiment achieves a high data transmission efficiency since, for example, a large volume of traffic is transmitted via the short-cut path. Communications in data centers, in particular, are separated for each user, and data is often transmitted between particular virtual machines. Accordingly, applying the optical network in accordance with the embodiment to a data center network in order to set up the short-cut path for data transmission between virtual machines belonging to the same user will enhance the data transmission efficiency.

Meanwhile, when all servers are connected with one hop to each other by using an AWG, each optical interface device needs to be connected to all of the other optical interface devices. That is, the optical network needs to adopt a mesh topology. In this case, in the optical network connecting N servers, each optical interface device needs to include at least N−1 optical transmitters and at least N−1 optical receivers.

In the optical network in accordance with the embodiment, by contrast, each optical interface device includes three optical transmitters (i.e., two fixed-wavelength optical transmitters and one wavelength tunable optical transmitter) and three optical receivers (i.e., two sets of a fixed-wavelength filter and a photo detector, and one set of a wavelength tunable optical filter and a photo detector). Accordingly, in comparison with the configuration adopting the mesh topology, each optical interface device within the optical network in accordance with the embodiment includes fewer optical transmitters and optical receivers, thereby reducing power consumption. In addition, the optical interface devices can be downsized and/or can be produced at a lower cost.

The present invention is not limited to the configuration or method in accordance with the aforementioned embodiment. That is, in the embodiment, the logical topology of the optical network is a bi-directional ring topology, but it may be a single ring topology. In this case, each of the optical interface devices 3-1 to 3-8 includes one fixed-wavelength optical transmitter and one fixed-wavelength optical receiver (a fixed-wavelength filter and a photo detector). The logical topology of the optical network does not need to be a ring.

A short-cut path for transmitting data bidirectionally between virtual machines is set up in the aforementioned embodiment, but a short-cut path for only unidirectional transmission may be set up. As an example, when the traffic from the first virtual machine to the second virtual machine is large and the traffic from the second virtual machine to the first virtual machine is small, only a short-cut path for data transmission from the first virtual machine to the second virtual machine may be set up. In this case, the resources (i.e., a wavelength tunable optical transmitter and a wavelength tunable filter) for setting up a short-cut path may be assigned to the communication between other virtual machines.

<Cooperation with Live Migration>

In the embodiments, it is assumed that the servers 6-1 to 6-8 can perform a live migration. The live migration can continue the operation of a virtual machine operated on a computer while moving this virtual machine to another computer. Accordingly, when there is a large volume of traffic between virtual machines implemented on different servers, the virtual machines may be implemented on the same server through the live migration so that the data transmission efficiency can be enhanced. However, it takes a long time to move a virtual machine to another server through the live migration. The live migration also causes a large network load. Accordingly, when the live migration is frequently performed within a network involving drastic traffic changes, the load on the CPU of each server and network will increase.

By contrast, in the optical path setup method in accordance with the embodiment, the optical interface device controls the wavelength of an optical signal so that a short-cut path between desired servers may be set up. That is, without increasing load on the CPU of each server and the network, the optical path setup method in accordance with the embodiment improves data transmission efficiency in a short time. Accordingly, to improve the efficiency of the transmission between virtual machines, it is preferable that the short-cut path in accordance with the embodiment is used prior to live migration.

FIG. 11 is a flowchart illustrating a method for using a short-cut path and live migration together. The processes indicated by this flowchart are performed by the manager system 5.

S11 to S13 are substantially the same as S1 to S3 described with reference to FIG. 9. That is, the manager system 5 monitors the traffic of each virtual machine and detects a virtual machine pair satisfying a specified condition.

In S14, the manager system 5 checks whether the wavelength tunable devices (i.e., the wavelength tunable optical transmitter 13 and the wavelength tunable filter 24) for setting up a short-cut path between the detected virtual machines are available. When such wavelength tunable devices are available, then, in S15, the manager system 5 sets up the short-cut path. The method for setting up the short-cut path is similar to the one in S5 in FIG. 9, i.e., the instruction is transmitted to the corresponding servers to set up the short-cut path.

When the wavelength tunable devices are already being used (S14: No), the manager system 5 performs the process of S16. In S16, the manager system 5 determines whether a server connected via an existing short-cut path has resources for implementing a new virtual machine. In this case, according to, for example, the number of virtual machines already implemented on the server, the manager system 5 determines whether the server has resources for implementing a new virtual machine.

When the aforementioned server has sufficient resources, then, in S17, the manager system 5 moves the detected virtual machine to the server connected via the existing short-cut path by live migration. Meanwhile, when the aforementioned server does not have sufficient resources, then, in S18, the manager system 5 moves the detected virtual machine to a server proximate to the server connected via the existing short-cut path by live migration. Here, the "server proximate to the server connected via the existing short-cut path" indicates a server that has the smallest hops from the server connected via the existing short-cut path and that has resources for implementing a new virtual machine.

Figure 12:
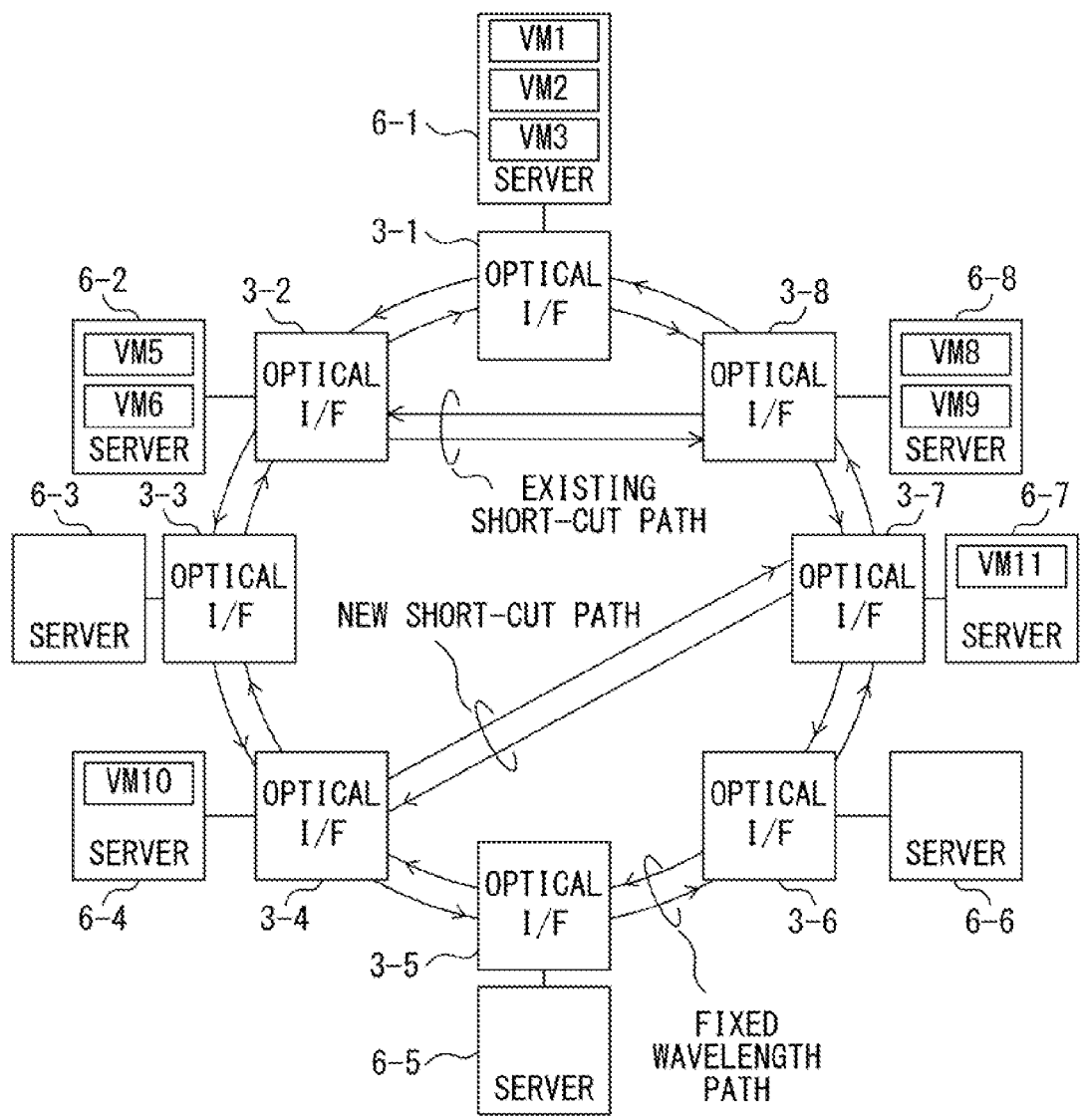
FIG. 12 and FIG. 13 illustrate examples of the process indicated in the flowchart illustrated in FIG. 11.
Figure 13:
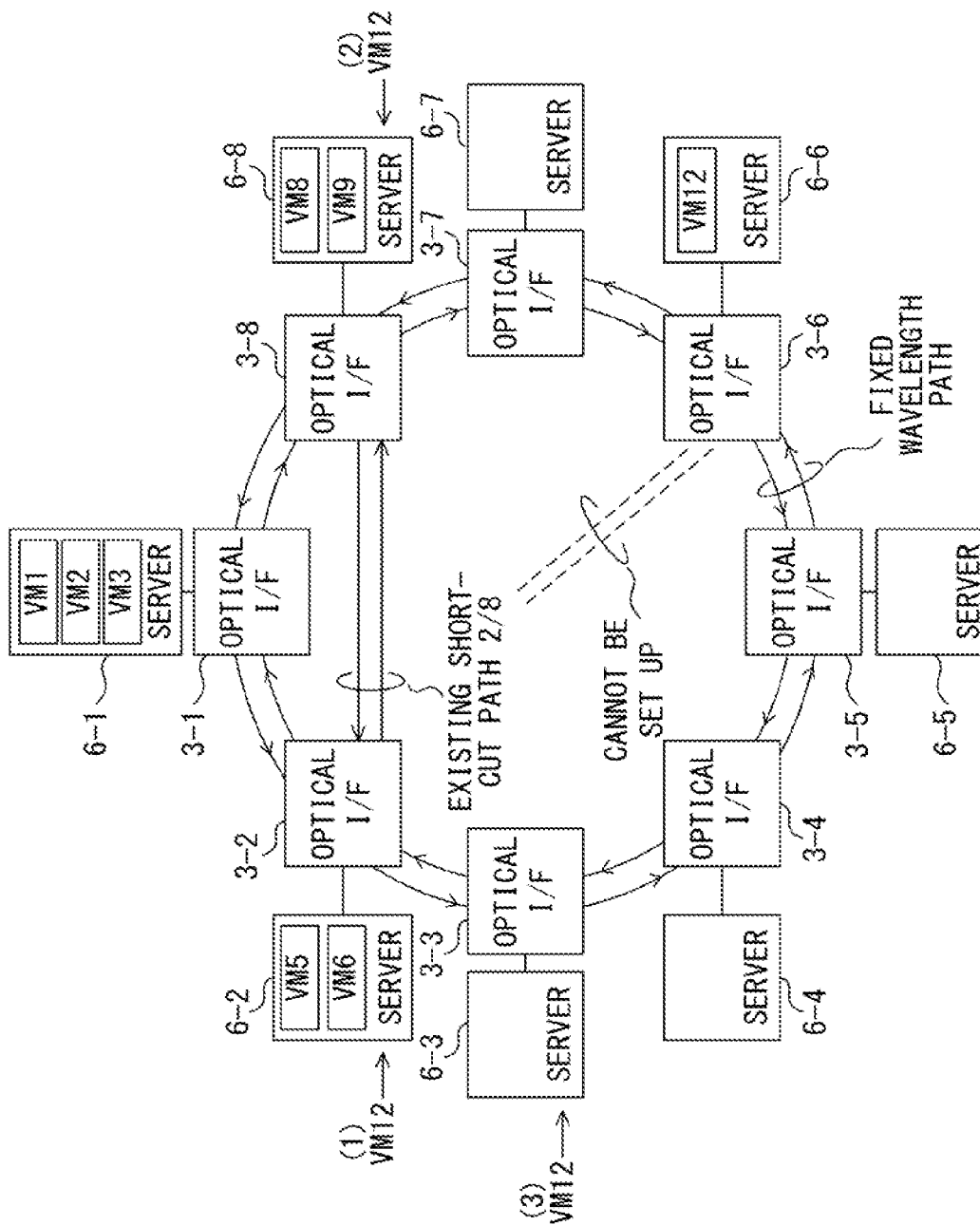

FIG. 12 and FIG. 13 illustrate examples of the process indicated in the flowchart illustrated in FIG. 11. In the examples, a short-cut path has already been set up for transmitting data between the virtual machine VM5 implemented on the server 6-2 and the virtual machine VM8 implemented on the server 6-8.

In the example illustrated in FIG. 12, the manager system 5 determines that the volume of traffic between the virtual machine VM10 implemented on the server 6-4 and the virtual machine VM11 implemented on the server 6-7 satisfies a specified condition. By so doing, the manager system 5 checks in S14 whether the resources of the optical interface devices 3-4 and 3-7 are available. In the example illustrated in FIG. 12, it is assumed that a short-cut path connected to the optical interface device 3-4 is not set up and a short-cut path connected to the optical interface device 3-7 is not set up at this moment. That is, the wavelength tunable optical transmitters 13 and the wavelength tunable filters 24 are available in both of the optical interface devices 3-4 and 3-7. In this case, accordingly, the manager system 5 sets up, in S15, a short-cut path connecting the optical interface devices 3-4 and 3-7. After this, the virtual machines VM10 and VM11 transmit data to each other via the newly set up short-cut path. In this way, the optical network in accordance with the embodiment can establish a plurality of short-cut paths simultaneously.

In the example illustrated in FIG. 13, the manager system 5 determines that the volume of traffic between the virtual machine VM6 implemented on the server 6-2 and the virtual machine VM12 implemented on the server 6-6 satisfies a specified condition. In this case, the manager system 5 checks in S14 whether the resources of the optical interface devices 3-2 and 3-6 are available. In FIG. 13, however, a short-cut path is already connected to the optical interface 3-2. That is, the optical interface device 3-2 does not have resources for setting up a new short-cut path, and hence a short-cut path cannot be set up between the optical interface devices 3-2 and 3-6.

In this case, the manager system 5 determines in S16 the live migration to be performed. First, the manager system 5 detects an existing short-cut path connected to the optical interface 3-2 corresponding to the virtual machine VM6 or the optical interface 3-6 corresponding to the virtual machine VM12. In this example, a short-cut path 2/8 established between the optical interfaces 3-2 and 3-8 is detected. Accordingly, the manager system 5 checks whether the servers connected to the short-cut path 2/8 (i.e., the servers 6-2 and 6-8) have resources for implementing a new virtual machine.

When the server 6-2 has resources for implementing a new virtual machine, the manager system 5 moves the virtual machine VN12 from the server 6-6 to the server 6-2 by live migration. In this case, the virtual machines VM6 and VM12 are operated on the same server so that data is transmitted and received without the optical switch 2.

When the server 6-2 does not have resources for implementing a new virtual machine and the server 6-8 has resources for implementing a new virtual machine, the manager system 5 moves the virtual machine VM12 from the server 6-6 to the server 6-8 by live migration. In this case, data is transmitted between the virtual machines VM6 and VM12 via the short-cut path 2/8 with one hop, thereby improving the transmission efficiency.

When neither the server 6-2 nor the server 6-8 has resources for implementing a new virtual machine, the manager system 5 searches for a server that is one-hop connected to the servers 6-2 or 6-8 and that has resources for implementing a new virtual machine. When such a server is found, the manager system 5 moves the virtual machine VM12 from the server 6-6 to this found server by live migration. In the example illustrated in FIG. 13, the virtual machine VM12 moves to the server 6-3. Alternatively, the virtual machine VM12 may move to a server one-hop connected to the server 6-8 (e.g., the server 6-7). In this case, data is transmitted between the virtual machines VM6 and VM12 via the fixed wavelength path between the optical interface devices 3-7 and 3-8 and the short-cut path 2/8 between the optical interface devices 3-2 and 3-8. That is, data is transmitted between the virtual machines VM6 and VM12 via two hops. In this case, the setting of the virtual switch 31 of the server 6-8 is updated so that data to be transmitted between the virtual machines VM6 and VM12 is transmitted via the short-cut path 2/8.

As described above, in the embodiments illustrated in FIGS. 11 to 13, when virtual machines having a high correlation with each other are detected on different physical servers, setting up of a short-cut path is performed prior to live migration. However, the priority between the live migration and setting up of a short-cut path may be determined in accordance with the communication environment. As an example, in an environment involving drastic traffic changes, setting up of a short-cut path may be preferentially performed. In an environment involving small traffic changes, the live migration may be preferentially performed.

<Other Configurations>

In the aforementioned embodiments, an optical interface device is provided for each physical server. By contrast, in the configuration illustrated in FIG. 14, an optical interface device is provided for each server system. That is, the optical interface devices 3-1 to 3-8 are respectively provided for server systems 7-1 to 7-8. Each of the server systems 7-1 to 7-8 is a server rack accommodating one or more physical servers (PSVs). Each of the server systems 7-1 to 7-8 has a Top-of-Rack switch (ToR-SW) 32 which aggregates the traffic of one or more physical servers. The Top-of-Rack switch 32 may be achieved by a virtual switch.

Figure 14:
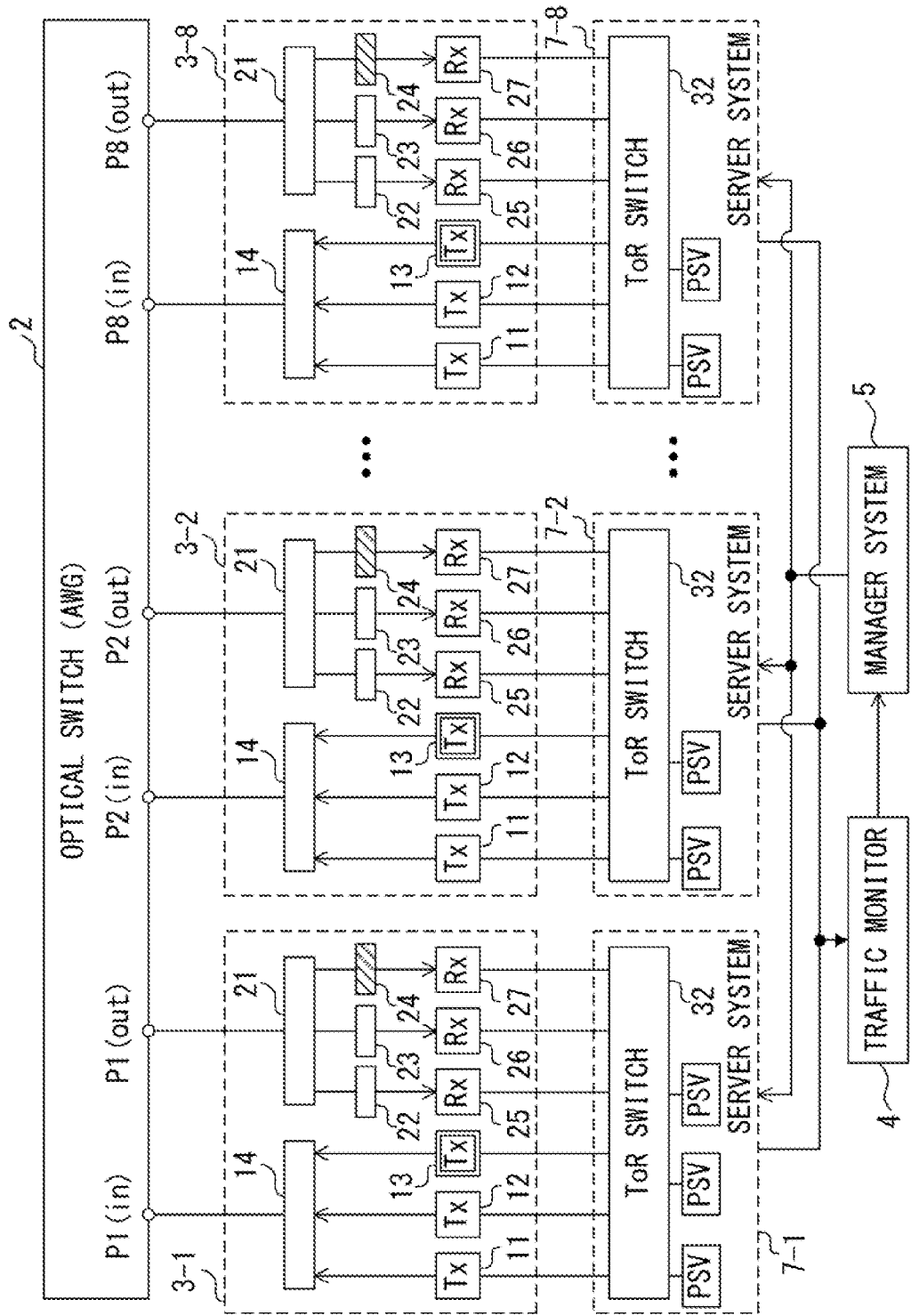
FIG. 14 illustrates a configuration for connecting a plurality of server systems.

The configurations and operations of the optical interface devices 3-1 to 3-8 in FIG. 14 are substantially the same as those in the aforementioned embodiments. However, the manager system 5 may set up a short-cut path according to the traffic between physical servers.

In the aforementioned embodiments, the optical network 1 connects the plurality of servers 6-1 to 6-8. In the configuration illustrated in FIG. 15, the server 6-8 is replaced with an electrical switch 8. The electrical switch 8 is, for example, a router, and connects the servers 6-1 to 6-7 to an external network. The external network is, for example, the internet.

The configuration and operation of the optical interface device 3-8 provided for the electrical switch 8 are substantially the same as those of the other optical interface devices 3-1 to 3-7. Accordingly, when there is a large volume of traffic between a certain server and the external network, a short-cut path is set up for transmitting data between the electrical switch 8 and this certain server.

Figure 15:
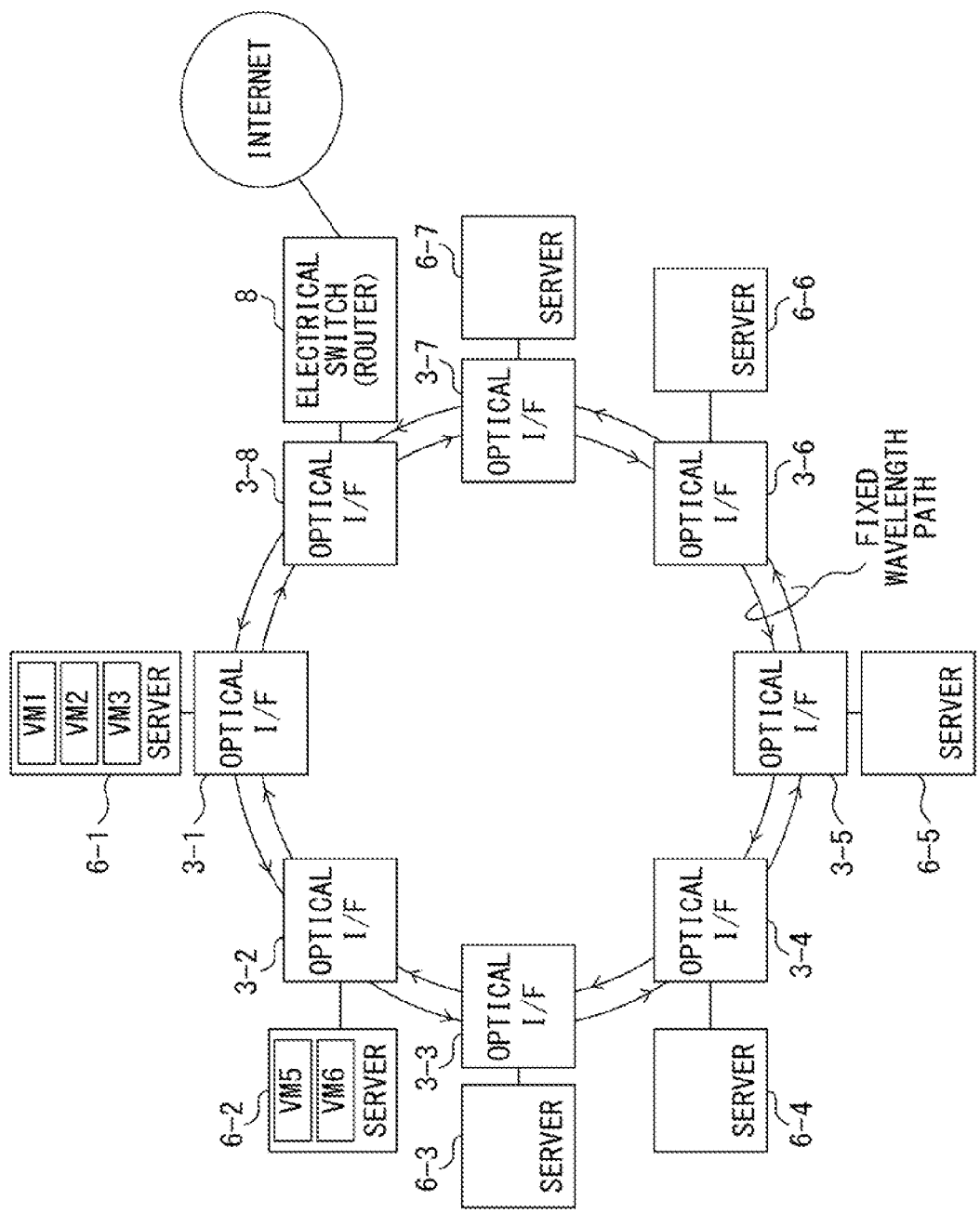
FIG. 15 illustrates a configuration connected to another network.

In the configuration illustrated in FIG. 15, the servers 6-1, 6-2, and so on may be replaced with the server systems 7-1, 7-2, and so on illustrated in FIG. 14. In this case, the server systems 7-1, 7-2, and so on are connected to the external network via the electrical switch 8.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:

1. An optical network comprising:
   an optical switch, that has a plurality of input ports and a plurality of output ports, to guide an input optical signal to an output port corresponding to a combination of an input port at which the input optical signal has reached and a wavelength of the input optical signal;
   a plurality of optical interface devices provided respectively for a plurality of servers and connected to the optical switch; and
   a manager to manage communication traffic of the plurality of servers, wherein each of the optical interface devices includes a fixed-wavelength optical transmitter and a wavelength tunable optical transmitter,
a first optical path is set up via the optical switch by using the fixed-wavelength optical transmitters of the plurality of optical interface devices,
the manager identifies first and second optical interface devices from among the plurality of optical interface devices in accordance with the communication traffic of the plurality of servers,
a second optical path is set up between the first and second optical interface devices via the optical switch by using the wavelength tunable optical transmitters of the first and second optical interface devices,
the first optical interface device controls the transmission wavelength of the wavelength tunable optical transmitter to be a first wavelength assigned to an optical path directed from the first optical interface device to the second optical interface device in the optical switch, and
the second optical interface device controls the transmission wavelength of the wavelength tunable optical transmitter to be a second wavelength assigned to an optical path directed from the second optical interface device to the first optical interface device in the optical switch.

2. The optical network according to claim 1, wherein
the manager generates a wavelength selection instruction for setting up the second optical path, and
the first and second optical interface devices respectively control a transmission wavelength of the wavelength tunable optical transmitter in accordance with the wavelength selection instruction.

3. The optical network according to claim 1, wherein
each of the optical interface devices further includes a wavelength tunable optical receiver,
the first optical interface device controls a reception wavelength of the wavelength tunable optical receiver to be the second wavelength, and
the second optical interface device controls the reception wavelength of the wavelength tunable optical receiver to be the first wavelength.

4. The optical network according to claim 1, wherein
the manager identifies the first and second optical interface devices in accordance with traffic of a virtual machine implemented on the servers.

5. The optical network according to claim 4, wherein
the manager detects first and second virtual machines, where a bandwidth of a traffic from the first virtual machine to the second virtual machine and a bandwidth of a traffic from the second virtual machine to the first virtual machine being substantially the same, by monitoring a characteristic of traffic of the virtual machine, identifies an optical interface device provided for a server on which the first virtual machine is operated as the first optical interface device, and identifies an optical interface device provided for a server on which the second virtual machine is operated as the second optical interface device.

6. The optical network according to claim 4, wherein
when traffic between a first virtual machine implemented on the first server and a second virtual machine implemented on the second server satisfies a specified condition and the wavelength tunable optical transmitter of at least one of the optical interface device provided for the first server and the optical interface device provided for the second server is used, the manager moves the first virtual machine to a server other than the first server.

7. The optical network according to claim 1, wherein each of the servers includes one or more physical servers.

8. An optical network comprising an optical switch having a plurality of input ports and a plurality of output ports, a plurality of optical interface devices connected to the optical switch, and a manager that manages communication traffic, wherein
the optical switch is configured to guide an input optical signal to an output port corresponding to a combination of an input port at which the input optical signal has reached and a wavelength of the input optical signal,
an electrical switch is provided for one of the plurality of optical interface devices, and a server is provided for each of the other of the plurality of optical interface devices,
the electrical switch connects the server to a network outside the optical network,
each optical interface device includes a fixed-wavelength optical transmitter and a wavelength tunable optical transmitter,
a first optical path is set up via the optical switch by using the fixed-wavelength optical transmitters of the plurality of optical interface devices,
the manager identifies first and second optical interface devices from among the plurality of optical interface devices in accordance with the communication traffic of the plurality of servers,
a second optical path is set up between the first and second optical interface devices via the optical switch by using the wavelength tunable optical transmitters of first and second optical interface devices,
the first optical interface device controls the transmission wavelength of the wavelength tunable optical transmitter to be a first wavelength assigned to an optical path directed from the first optical interface device to the second optical interface device in the optical switch, and
the second optical interface device controls the transmission wavelength of the wavelength tunable optical transmitter to be a second wavelength assigned to an optical path directed from the second optical interface device to the first optical interface device in the optical switch.

9. An optical path setup method to set up an optical path by using: an optical switch having a plurality of input ports and a plurality of output ports; and a plurality of optical interface devices provided respectively for a plurality of servers and connected to the optical switch, wherein the optical switch guides an input optical signal to an output port corresponding to a combination of an input port at which the input optical signal has reached and a wavelength of the input optical signal, the method comprises:
setting up a first optical path via the optical switch by using fixed-wavelength optical transmitters of the plurality of optical interface devices; and
setting up a second optical path between first and second optical interface devices via the optical switch by using a wavelength tunable optical transmitter of at least one of first and second optical interface devices identified from among the plurality of optical interface devices in accordance with communication traffic of the plurality of servers, wherein
the first optical interface device controls the transmission wavelength of the wavelength tunable optical transmitter to be a first wavelength assigned to an optical path directed from the first optical interface device to the second optical interface device in the optical switch, and
the second optical interface device controls the transmission wavelength of the wavelength tunable optical transmitter to be a second wavelength assigned to an optical path directed from the second optical interface device to the first optical interface device in the optical switch.

* * * * *